United States Patent [19]

Lidman

[11] Patent Number: 5,207,177
[45] Date of Patent: May 4, 1993

[54] PULSATOR

[75] Inventor: Magnus Lidman, Tumba, Sweden

[73] Assignee: AB Manus, Tumba, Sweden

[21] Appl. No.: 781,239

[22] PCT Filed: May 15, 1991

[86] PCT No.: PCT/SE91/00342
§ 371 Date: Jan. 7, 1992
§ 102(e) Date: Jan. 7, 1992

[87] PCT Pub. No.: WO91/17651
PCT Pub. Date: Nov. 28, 1991

[30] Foreign Application Priority Data

May 18, 1990 [SE] Sweden ................................ 9001825

[51] Int. Cl.$^5$ ............................................... A01J 5/14
[52] U.S. Cl. ................................ 119/14.28; 119/14.41; 137/112
[58] Field of Search ................ 119/14.27, 14.28, 14.29, 119/14.3, 14.31, 14.32, 14.33, 14.34, 14.35, 14.41; 137/112

[56] References Cited

U.S. PATENT DOCUMENTS

| 1,159,103 | 11/1915 | Sabroe . | |
|---|---|---|---|
| 1,322,589 | 11/1919 | Leitch | 119/14.41 |
| 1,641,316 | 9/1927 | Bruun . | |
| 2,160,651 | 5/1939 | Erling | 119/14.41 |
| 4,354,518 | 10/1982 | Kuroda et al. | 137/112 |

FOREIGN PATENT DOCUMENTS 2089638 6/1982 United Kingdom .

Primary Examiner—John G. Weiss
Attorney, Agent, or Firm—Hovey, Williams, Timmons & Collins

[57] ABSTRACT

A pulsator has two valve devices (1, 2), each of which is adapted to alternately subject a pulsation space to two different pressures. In order to avoid the two valve devices (1, 2) from disturbing each other during the alternations between the two pressures a third valve device (23) is arranged, for closing communication between one of the valve devices and the lower one of said two pressures, when the other valve device is operated to alternate the pressure in the pulsation space from the lower one to the higher one of said two pressures.

4 Claims, 1 Drawing Sheet

PULSATOR

BACKGROUND OF THE INVENTION

The present invention relates to a pulsator, comprising first and second valve devices, each of which has a pulsation outlet, a pressure inlet to be connected to a first source of pressure generating a first pressure, and a pressure outlet to be connected to a second source of pressure generating a second pressure, which is lower than said first pressure. Means is provided for adjusting each valve device for alternately connecting the pulsation outlet of the valve device to said first source of pressure via the pressure inlet of the valve device and to said second source of pressure via the pressure outlet of the valve device.

DESCRIPTION OF THE PRIOR ART

There is a known pulsator of this kind which among other things is utilized in milking machines for providing cyclic pressure alternation in the pulsation spaces of the teat cups, i.e. the spaces formed in the teat cups between the walls of the teat cups and the liners mounted in the teat cups. In this case, four teat cups are usually connected in pairs to each one of the two pulsation outlets of the first and second valve devices in the known pulsator, and said first source of pressure is constituted by atmosphere, while said second source of pressure is constituted by a source of subatmospheric pressure.

The known pulsator is operated with the two valve devices offset in phase relative to each other, which means that when vacuum (subatmospheric pressure) prevails in the pulsation spaces of one of the pairs of teat cups, atmospheric pressure can prevail in the pulsation spaces of the other pair of teat cups. However, during each pulsation cycle comprising a period of atmospheric pressure and a period of vacuum, the period of atmospheric pressure normally has a shorter duration than the period of vacuum. During a certain time of each pulsation cycle, vacuum therefore prevails simultaneously in the pulsation spaces of all of the four teat cups. This has the consequence that when the pulsation outlet of one of the valve devices communicates with the source of subatmospheric pressure and the other valve device is operated by the adjustment means to adjust the pulsation outlet from communication with atmosphere to communication with the source of subatmospheric pressure, for a short moment atmosphere can also communicate with the pulsation outlet of said one valve device via the necessary conduit connections between the two valve devices and the source of subatmospheric pressure. During said short moment atmospheric pressure thus occurs in the pulsation spaces of the pair of teat cups connected to said one valve device, which is felt by a cow being milked as unpleasant pressure impacts against her teats.

Of course, it would be possible to avoid occurrence of such unpleasant pressure impacts if each valve device were constructed such that during each alternation operation, the pulsation outlet of the valve device is kept closed, when the adjustment means adjusts the pulsation outlet from connection with the pressure inlet (atmospheric pressure) to connection with the pressure outlet (subatmospheric pressure). However, valve devices constructed in this way would substantially increase the price of the pulsator.

The intensity of said pressure impacts could also be reduced so that the cows would feel the impacts less unpleasant, if the alternation operation of the valve devices could take place in a faster rate. However, this would require complicated valve devices, probably including servo systems, which would lead to too expensive pulsators.

In milking pulsators it is known to arrange two non-return valves in the connections between the two pressure outlets of the valve devices and the source of subatmospheric pressure to eliminate said pressure impacts or at least reduce their intensity. During the adjustment of one of the two valve devices for alternating the pulsation outlet from connection with the pressure inlet, which communicates with atmosphere, to connection with the pressure outlet, the non-return valve between the source of subatmospheric pressure and the pressure outlet of the other valve device will close the resulted flow of air. Such an arrangement of non-return valves has certain drawbacks, however. Thus, if each non-return valve would be self-closing by means of for instance a spring, the non-return valve would give rise to a pressure drop proportional to the occurring self-closing force. Such a pressure drop would disturb the desired level of vacuum in the pulsation spaces of the teat cups, whereby the milking operation would be jeopardized.

On the other hand, if each non-return valve would not be self-closing, a volume of air would have to flow momentarily through the non-return valve in order to create a sufficient pressure difference across the non-return valve to close the latter. Such a momentary flow of air would also give rise to non-desirable pressure impacts against the cows' teats as described above, though of not quite such a strong intensity as that of pulsators without non-return valves.

SUMMARY OF THE INVENTION

The object of the present invention is to provide a simple and inexpensive pulsator, which eliminates momentary pressure impacts in the pulsation outlets, when subatmospheric pressure prevails in any of the pulsation outlets during operation.

This object is obtained by means of a pulsator of the kind initially stated, which mainly is characterized by a third valve device having a valve housing, which forms a chamber, a first inlet to the chamber, connected to the pressure outlet of the first valve device, a second inlet to the chamber connected to the pressure outlet of the second valve device, first and second valve seats extending around respective openings of the first and second inlets in the chamber, and an outlet in the chamber to be connected to said second source of pressure, and a valve member, which is displaceable in the chamber between a first position, at which the valve member abuts sealingly against the first valve seat, and a second position, at which the valve member abuts sealingly against the second valve seat.

Suitably, the first and second valve seats of the valve housing face each other, which has the advantage that the valve member only needs to perform a short transversal movement to alternate between said first and second positions.

Preferably, the valve member is freely movable in the chamber between said first and second positions, whereby the required force to move the valve member can be minimized.

Figure 1:
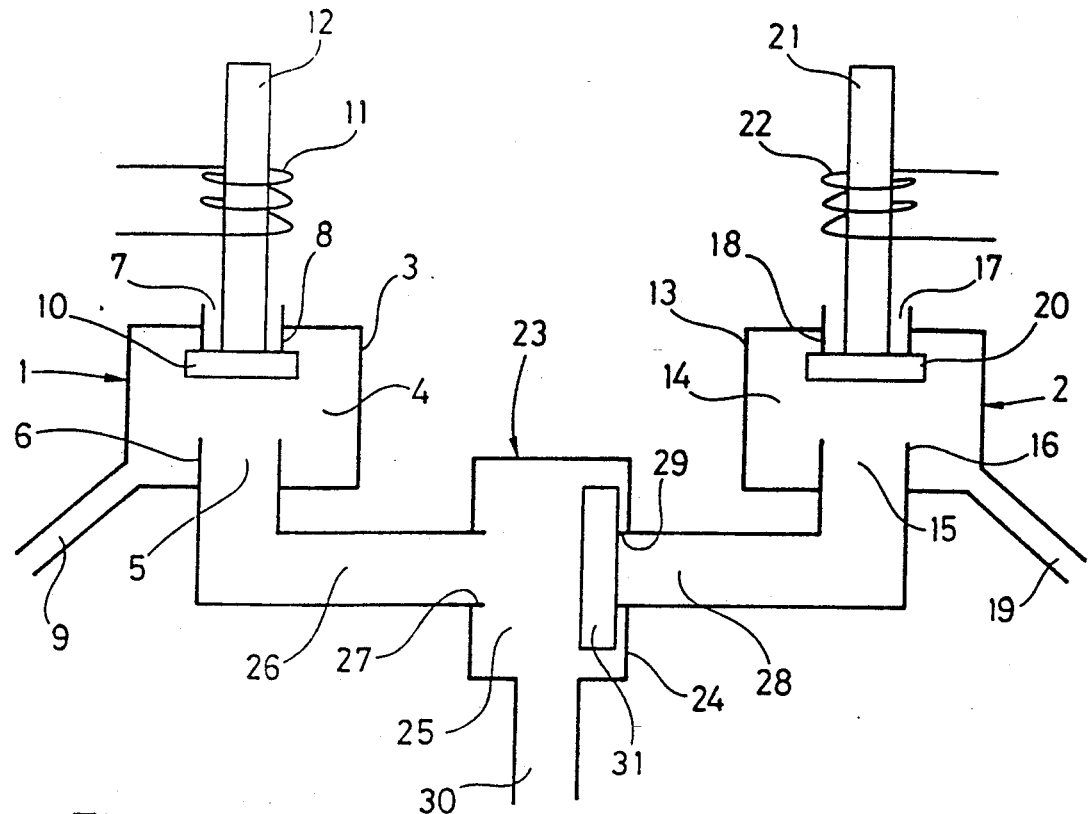
FIG. 1 is a schematic representation of a pulsator in accordance with the present invention.
Figure 2:
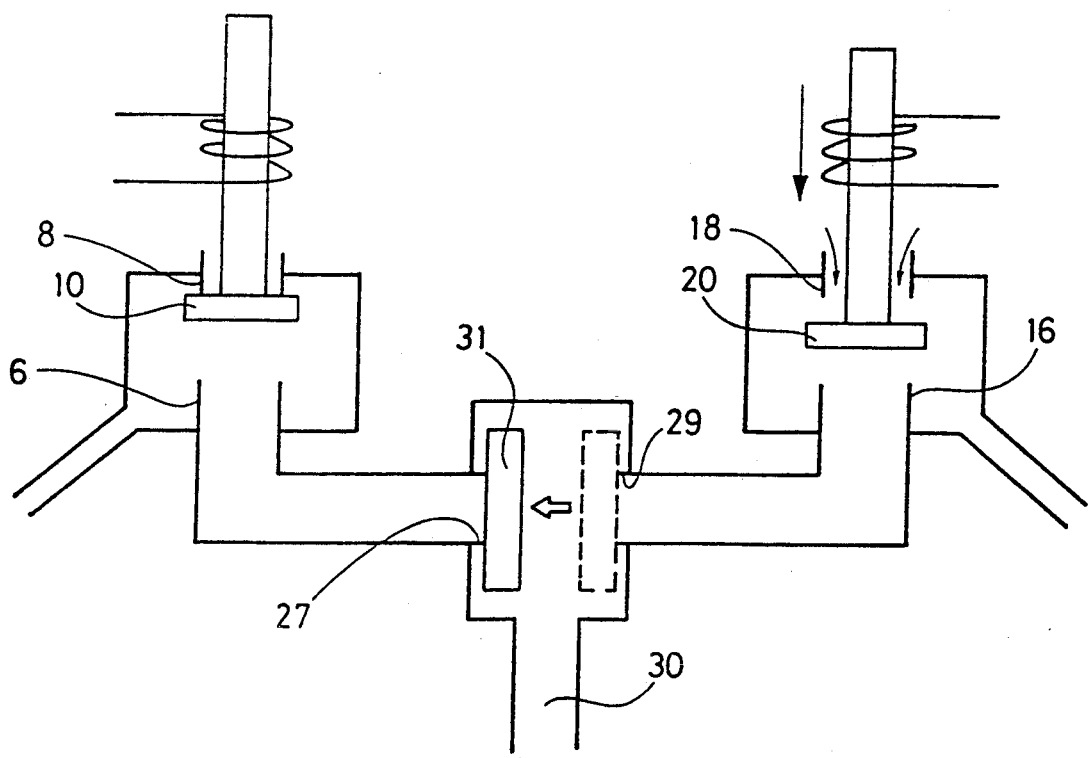
FIG. 2 is a schematic representation of the pulsator of FIG. 1 in another adjustment.

The pulsator shown in FIGS. 1 and 2 comprises two similar valve devices 1 and 2, each of which is designed as a conventional electro-magnetically controlled three-way valve. Thus, the valve device 1 comprises a valve housing 3 with a chamber 4, an outlet 5 from the chamber 4, a valve seat 6, which surrounds the opening of the outlet 5 in the chamber 4, an inlet 7 to the chamber 4, a valve seat 8, which surrounds the opening of the inlet 7 in the chamber 4, and a pulsation outlet 9 from the chamber 4. A valve member 10 is situated in the chamber 4 and is provided with a valve shaft 12 extending through the inlet 7. The valve shaft 12, which is magnetic, extends further through a coil 11. By activating the coil 11 with an applied voltage the valve member 10 can be displaced to abut sealingly against one of the valve seats 6 and 8.

Analogous to the valve device 1 the valve device 2 comprises a valve housing 13 with a chamber 14, an outlet 15, a valve seat 16, which surrounds the outlet 15, an inlet 17, a valve seat 18, which surrounds the inlet 17, and a pulsation outlet 19. A valve member 20 in the chamber 14 has a valve shaft 21 extending through the inlet 17 and a coil 22.

A third valve device 23 comprises a valve housing 24 with a chamber 25, an inlet 26 to the chamber 25, a valve seat 27, which surrounds the opening of the inlet 26 in the chamber 25, an inlet 28, which is situated in front of the inlet 26, a valve seat 29, which surrounds the opening of the inlet 28 in the chamber 25 and faces the valve seat 27, and an outlet 30 from the chamber 25.

In the chamber 25 there is a sheet shaped light valve member 31, which is freely movable in the chamber 25 between a first position, at which the valve member 31 seals against the valve seat 27, and a second position, at which the valve member 31 seals against the valve seat 29. (The valve member 31 may also have other shapes, such as that of a ball).

The outlets 5 and 15 are connected to the inlets 26 and 28, respectively, while the inlets 7 and 17 communicate directly with atmosphere.

The pulsator according to FIGS. 1 and 2 is operated in the following manner when for instance using it in milking machines:

The pulsation outlets 9 and 19 are connected to the pulsation spaces of two pairs of teat cups and the outlet 30 is connected to a source of subatmospheric pressure. With the valve devices 1, 2 and 23 in the adjustments shown in FIG. 1, vacuum prevails in the pulsation spaces in all of the four teat cups. When for instance the coil 22 is activated for adjusting the valve member 20 to seal against the valve seat 16, so that atmospheric pressure will prevail in the pulsation spaces which are connected to the pulsation outlet 19, atmosphere will communicate for a short moment with the inlet 28 via the inlet 17, the chamber 14 and the outlet 15 during the displacement of the valve member 20 towards the valve seat 16 (FIG. 2). Since the pressure in the inlet 28 consequently increases a pressure difference occurs across the valve member 31, which results in that the valve member 31 is pushed through the chamber 25 to abut sealingly against the valve seat 27. Thus, any increase in pressure does not occur in the pulsation outlet 9, whereby neither any pressure impacts occur in the evacuated pulsation spaces, which are connected to the pulsation outlet 9.

Since the period of atmospheric pressure has shorter duration than the vacuum period during each pulsation cycle, the valve member 20 is displaced back to the valve seat 18 before the valve member 10 is displaced from the valve seat 8. First thereafter the valve member 10 is displaced towards the valve seat 6, which results in that the valve member 31 is pushed back to abut sealingly against the valve seat 29. When the period of atmospheric pressure has passed for the pulsation spaces which are connected to the pulsation outlet 9, the valve member 10 is displaced back to the valve seat 8, whereby the pulsator again assumes the condition shown in FIG. 1.

I claim:

1. In a pulsator comprising first and second valve devices, each of said first and second valve devices having a pulsation outlet, a pressure inlet to be connected to a first source of pressure for generating a first pressure, and a pressure outlet to be connected to a second source of pressure for generating a second pressure, said second pressure being lower than said first pressure, said pulsator further comprising means for adjusting each of said first and second valve devices for alternately connecting the pulsation outlet of each said valve device to said first source of pressure via the respective inlet of the valve device and to said second source of pressure via the respective pressure outlet of the valve device, wherein the improvement comprises a third valve device having a valve housing forming a chamber, a first inlet to said chamber connected to the pressure outlet of the first valve device, a second inlet to said chamber connected to the pressure outlet of the second valve device, first and second valve seats extending around respective openings of the first and second inlets in said chamber, an outlet from said chamber connected to said second source of pressure, and a valve member which is displaceable in the chamber between a first position at which the valve member abuts sealingly against the first valve seat, and second position, at which the valve member abuts sealingly against the second valve seat.

2. A pulsator according to claim 1, wherein said first and second valve seats of said housing face each other in the chamber.

3. A pulsator according to claim 1, wherein said valve member is freely movable in the chamber between said first and second positions.

4. A pulsator according to claim 2, wherein said valve member is freely movable in the chamber between said first and second positions.

* * * * *